April 13, 1926.
S. SEGAL
PADLOCK
Filed April 27, 1923     3 Sheets-Sheet 1
1,580,574
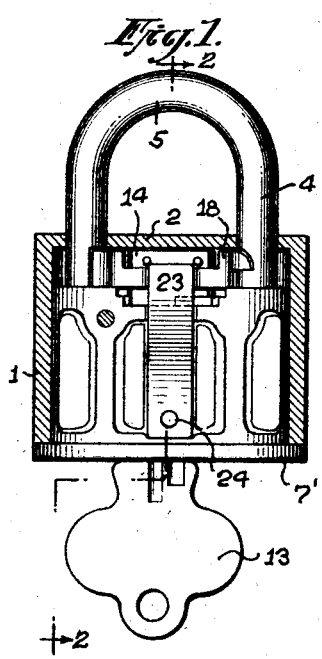
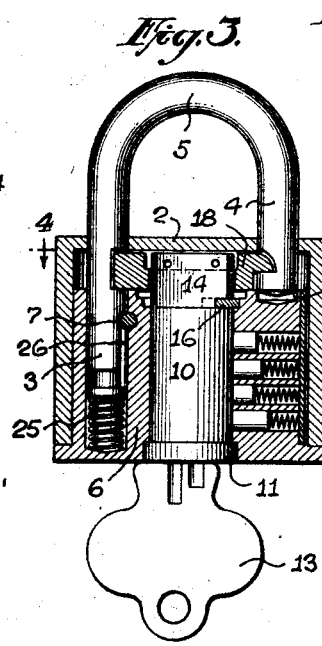
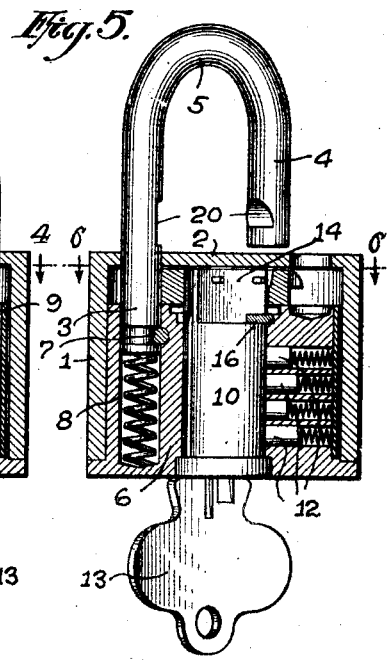
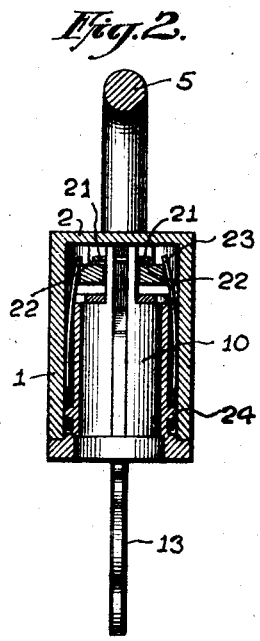
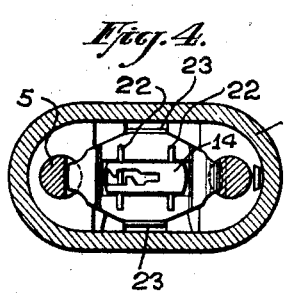
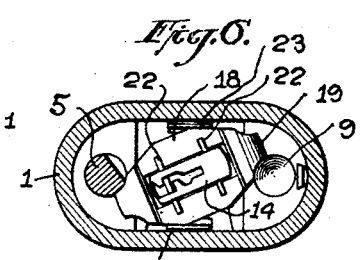
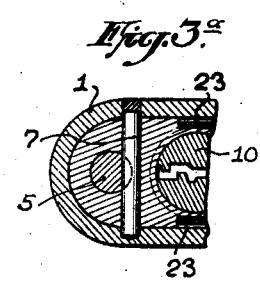
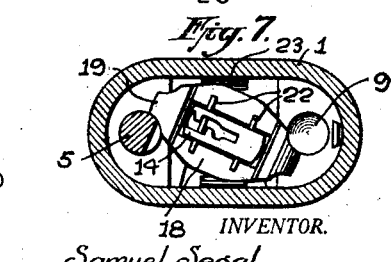
INVENTOR.
Samuel Segal.
BY Townsend & Decker
ATTORNEYS.

April 13, 1926.
S. SEGAL
PADLOCK
Filed April 27, 1923
1,580,574
3 Sheets-Sheet 2
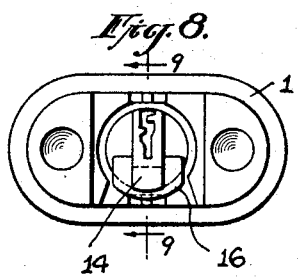
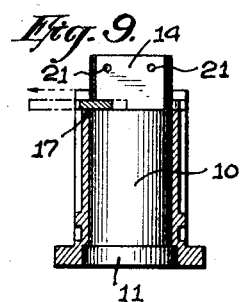
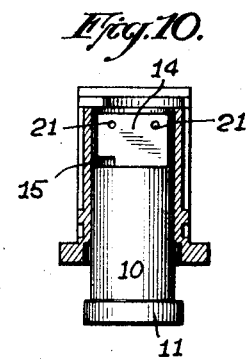
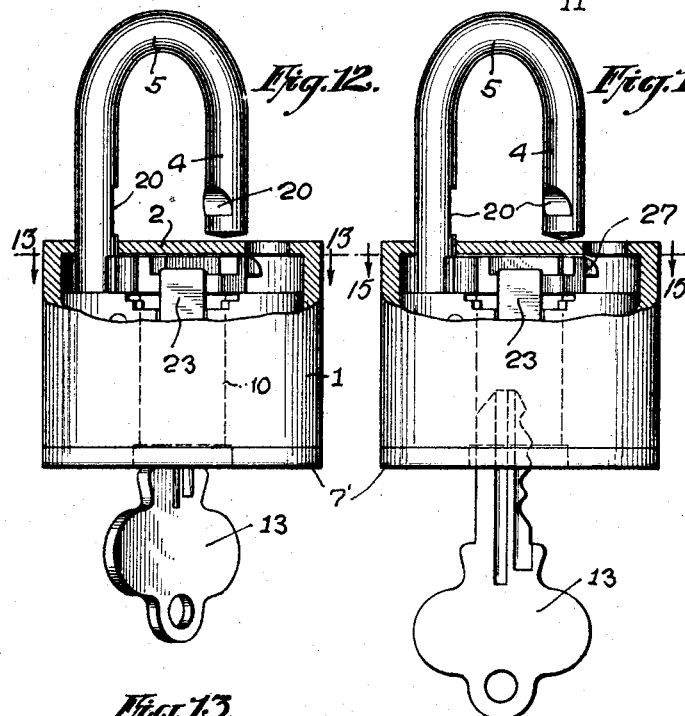
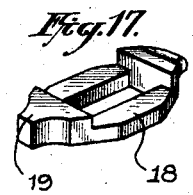
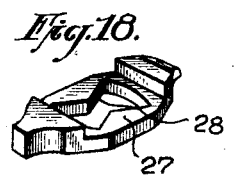
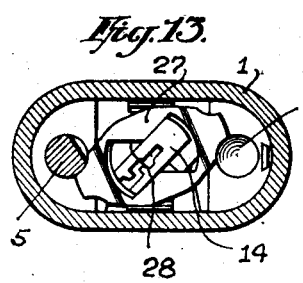
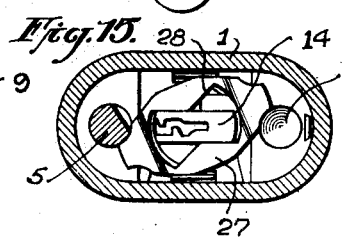
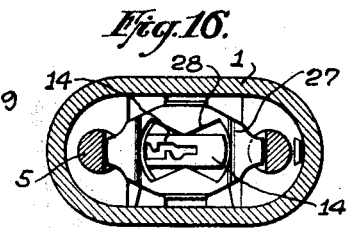
INVENTOR.
Samuel Segal
BY Townsend + Decker
ATTORNEYS

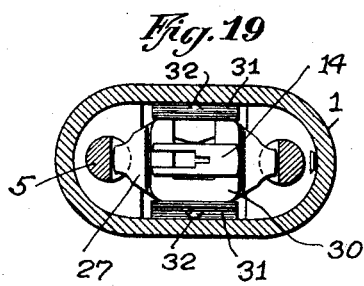
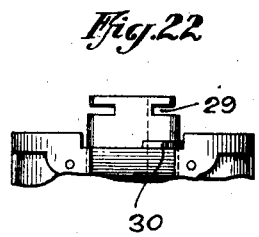
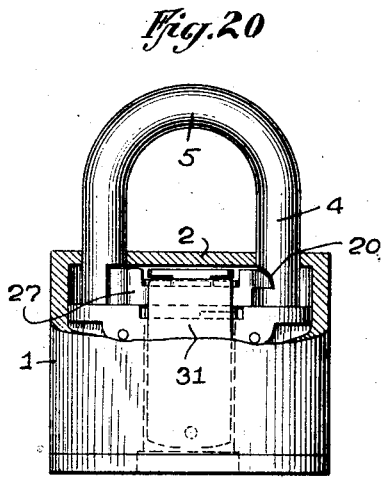
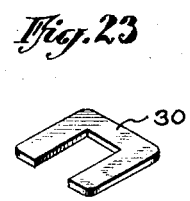
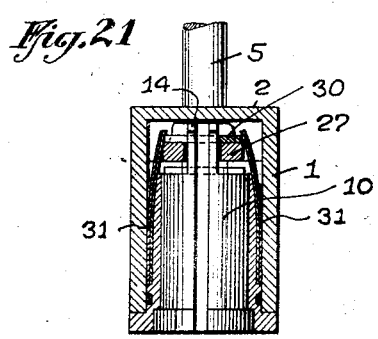
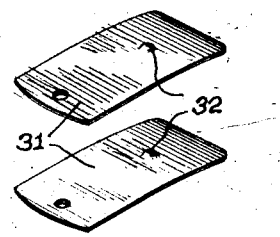

Patented Apr. 13, 1926.

1,580,574

UNITED STATES PATENT OFFICE.

SAMUEL SEGAL, OF NEW YORK, N. Y., ASSIGNOR TO SEGAL METAL PRODUCTS COMPANY INC., OF NEW YORK, N. Y., A CORPORATION OF DELAWARE.

PADLOCK.

Application filed April 27, 1923. Serial No. 634,990.

*To all whom it may concern:*

Be it known that I, SAMUEL SEGAL, a citizen of the United States, and a resident of New York, in the county of New York and State of New York, have invented certain new and useful Improvements in Padlocks, of which the following is a specification.

My invention has for its object the production of a padlock of strength and of simplicity of construction, which shall be preferably operated or actuated by a pin tumbler mechanism. The invention is, for a padlock of the general type shown and described in my prior Patent No. 1,439,131, dated December 19, 1922, but contains several novel features and improvements over the device of said patent.

Among the improvements of the present invention over the device described in the patent referred to are the construction of the locking means for holding the shackle against removal, the construction and location of the spring means for retaining said locking means in normal or locked position and the construction of certain removable means adapted to prevent the key-plug from withdrawal from the padlock casing.

Other objects, advantages and improvements over the aforesaid patent will appear from the accompanying description, the invention consisting in the novel parts and combinations of parts hereinafter more particularly described and then specified in the claims.

In the accompanying drawings showing a practical embodiment of the invention:

Fig. 1 is a side elevation of my improved padlock with the hollow body or casing thereof shown in section whereby the interior parts may be clearly seen.

Fig. 2 is a section on the line 2—2 of Fig. 1.

Fig. 3 is a horizontal section taken through the padlock showing the key-plug in elevation and the shackle in closed and locked position.

Fig. 3ª is a horizontal section taken through a part of the device showing the means for preventing the withdrawal of the long leg of the shackle from the body or casing of the padlock.

Fig. 4 is a horizontal section on the line 4—4 of Fig. 3.

Fig. 5 is a view similar to Fig. 3 but showing the shackle in unlocked or open position.

Fig. 6 is a horizontal section on the line 6—6 of Fig. 5.

Fig. 7 is a view similar to Fig. 6 but showing the locking dog in a different position.

Fig. 8 is a plan view of the padlock with the shackle, the upper wall of the body and the locking dog removed.

Fig. 9 is a vertical cross-section on the line 9—9 of Fig. 8.

Fig. 10 is a view similar to Fig. 9 showing the locking means for the key plug removed and the key plug partially withdrawn from the plug portion of the padlock.

Fig. 11 is a perspective view of the locking plate for preventing withdrawal of the key plug.

Fig. 12 is a front elevation of a modification with the casing partially broken away to show the interior mechanism.

Fig. 13 is a horizontal section on the line 13—13 of Fig. 12.

Fig. 14 is a view similar to Fig. 12 showing the key of the padlock partially withdrawn even though the shackle is in open position.

Fig. 15 is a horizontal section on the line 15—15 of Fig. 14.

Fig. 16 is a view similar to Figs. 13 and 15 but showing the locking dog in normal or locked position.

Fig. 17 is a perspective view of the locking dog of the preferred form of the invention.

Fig. 18 is a perspective view of the locking dog of the modification.

Fig. 19 is a plan view of a further modification showing the casing in section whereby the interior mechanism may be viewed.

Fig. 20 is a front elevation of the modification of Fig. 19 showing the upper portion of the casing partially broken away.

Fig. 21 is a vertical cross-section taken through the modification just referred to.

Fig. 22 is a front elevation of the upper end of the key plug of said modification.

Fig. 23 is a perspective view of the locking device for preventing removal of the locking dog from the key plug.

Fig. 24 is a perspective view of the springs of the modification for retaining the locking dog in normal or locked position.

Referring in detail to the several figures of the drawings and more especially to Figs. 1 to 11 inclusive and Fig. 17.

The hollow body or casing of the padlock is indicated at 1 and is provided with bores or annular openings in the top or upper wall thereof for receiving the long and short legs 3 and 4 respectively of the shackle 5. The plug portion of the padlock is indicated at 6. This plug portion, together with all the other interior parts of the mechanism, is slipped bodily into the casing and is prevented from removal therefrom by a rivet 7 passing through the plug portion and the opposite walls of the casing. Said plug portion 6 is also provided with a face plate 7' preferably integral therewith which engages the lower edge of the casing when the parts are in assembled position. The portion 6 is also provided adjacent one side thereof with a bore 8 for receiving the longer leg 3 of the shackle and with an annular opening 9 adjacent the other side for receiving the shorter leg 4.

The portion 6 constitutes the barrel of an ordinary pin tumbler lock and receives therein a rotatable key plug 10 the head 11 of which interfits with a suitable annular opening in the face plate 7'. A plurality of spring-actuated tumblers 12 are slidably mounted within suitable chambers in the portions 6 and are adapted to enter openings (not shown) in the key plug 10 to prevent rotation thereof. The key plug 10 may be rotated by a key 13, as ordinarily, which is inserted in a slot in the head 11 and plug 10 to force the pin tumblers 12 from within the openings of the key plug in a well known manner forming no part of my invention.

The end of the key plug 10 is reduced and flattened as at 14 and is provided with a slot 15 therein as clearly indicated in Fig. 10. Said slot is adapted to removably receive a U-shaped locking plate 16 the legs of which engage the sides of the end 14 of the key plug and the body of which engages a shoulder 17 of the plug portion, whereby withdrawal of said key plug from the padlock is prevented. A slotted locking dog is indicated at 18 and is provided with ends 19 having rounded walls as shown in Fig. 17, said ends being adapted to enter notches 20 in the legs of the shackle. The reduced end 14 of the key plug carries the slotted locking dog 18, the slot thereof interfitting with said end whereby rotation of said key plug will rotate said locking dog. Said end 14 is also provided with perforations 21 receiving pins 22 whereby dislodgement or removal of said locking dog from the key plug is prevented.

For retaining the locking dog in normal or locked position or that position shown in Fig. 4 whereby the ends 19 of the locking dog will engage within the notches 20, I have provided flat springs 23 which lie in suitable vertical grooves in either side of the plug portion 6. The lower ends of said springs are perforated and are received by suitable lugs 24 on the plug portion (Fig. 2) whereby the springs are prevented from becoming displaced or from a sliding movement while the upper ends of said springs engage and exert a spring pressure against the sides of the locking dog.

Within the bore 8 is a compression spring 25 which engages the lower end of the leg 3 of the shackle and tends by its action to force said leg upwardly within said bore. The side of said leg 3 is grooved as at 26 and the rivet 7 engages within said groove. Said rivet thus performs the duel function of limiting the movement of the leg 7 in the bore 8 and of holding the plug portion within the casing as has been explained.

The operation of the padlock is as follows:

Assuming that the shackle is in closed position as shown in Figs. 3 and 4 with its legs extending within the bore 8 and opening 9 respectively, to open the shackle so that it will take the position shown in Fig. 5, the key plug is rotated in either direction (see Figs. 6 and 7) by means of the key 13. As the locking dog 18 is carried by the key plug, as has been explained, the ends 19 thereof are released from their engagement with the notches 20 in the legs of the shackle and the action of the spring 25 forces the shackle upwardly, this upward movement being limited by the rivet 7. The degree of rotation of the key plug and accordingly of the locking dog is limited by the casing which acts as a stop therefor. Obviously, also, when the shackle is open, an end 19 of the locking dog abuts against the long leg of the shackle and prevents rotation of the locking dog and of the key plug thereby making it impossible to remove the key until the shackle has been returned to closed position and the ends 19 of the locking dog have entered their respective notches 20 in the shackle. This feature is of distinct advantage for the reason that it prevents removal and possible loss of the key when the shackle is open.

A further advantage of the construction described lies in the fact that, in contradistinction to certain types of padlocks, the shackle cannot be released or opened without using a key by striking the casing a heavy blow to dislodge the locking dog from engagement with the shackle. In the present case, as the locking dog and key plug fit together, the locking dog may be actuated only by means of the proper key for the key plug.

The modified construction illustrated in Figs. 12 to 16 inclusive and Fig. 18 permits the key to be withdrawn even though the shackle is open for the reason that the locking dog 27 of this construction is provided with an opening 28 of a size and configuration permitting the reduced end of the key plug to be partially rotated therein a distance sufficient to permit rotation of the key plug to its initial position whereby the key slot will be in proper alignment for removal of the key.

In the modification illustrated in Figs. 19 to 24 inclusive the reduced end of the key plug is provided with a slot 29 adapted to removably receive a U-shaped locking plate 30 which performs the same function as the pins 22 in the preferred form of the invention. In this modification also, I may employ in lieu of the spring 23 in the preferred form of the invention, a pair of broad springs 31 for each side of the device, these springs being provided with tits 32 interfitting with each other. Said tits 32 prevent these springs from relative movement with respect to each other. I have found in practice that the use of two springs is desirable for reason that a greater spring action is gained than if one spring only is used. If one thick spring were used it would apt to set.

What I claim as my invention is:

1. In a padlock, a body, a shackle, a key plug in said body having a reduced end with flattened sides and a locking dog provided with a slot or opening therein receiving said reduced end, said locking dog being adapted to hold said shackle against movement.

2. In a padlock, a body, a shackle, a key plug in said body having a reduced end with flattened sides, a locking dog provided with a slot or opening therein receiving said reduced end, said locking dog being adapted to hold said shackle against movement and means for preventing removal of said lockdog from said key plug.

3. In a padlock, a body, a shackle, a key plug mounted in said body provided with a slot therein, a locking dog carried by said key plug and adapted to interlock with said shackle and a removable locking plate entering said slot for preventing removal of said locking dog from said key plug.

4. In a padlock, a body, a shackle, a key plug mounted in said body and having a slot therein, a locking dog carried by said key plug and adapted to interlock with said shackle and a removable U-shaped locking plate adapted to enter said slot to prevent removal of said locking dog from said key plug.

5. In a padlock, a body, a plug portion in said body a shackle, a key plug mounted in said body, a locking dog associated with said key plug and adapted to interlock with said shackle and spring members extending longitudinally of said body intermediate said body and plug portion and bearing against said locking dog and tending to retain said locking dog in locked position.

6. In a padlock, a body, a shackle, a key plug within said body, a locking dog associated with said key plug and adapted to interlock with said shackle, a lug on said body and a spring provided with a perforation received by said lug, said spring engaging said locking dog and tending to retain the same in locked position.

7. In a padlock, a plug portion having grooves in the opposite walls thereof extending longitudinally of said plug portion, a casing receiving said plug portion, a rotatable key plug, a shackle, a locking dog associated with said key plug and adapted to hold said shackle against movement and spring members lying in the grooves in said plug portion and bearing against said locking dog and tending to hold said locking dog in normal or locked position.

8. In a padlock, a body, a shackle, a key plug in said body, a locking dog associated with said key plug for holding said shackle against movement and a plurality of springs having tit members engageing with each other, said springs bearing against said locking dog and acting to retain the same in engagement with said shackle.

Signed at New York, in the county of New York and State of New York, this 26th day of April A. D. 1923.

SAMUEL SEGAL.